Dec. 11, 1923.　　F. C. ROBERTSON ET AL　　1,477,007
HORSESHOE
Filed April 2, 1921　　2 Sheets-Sheet 1
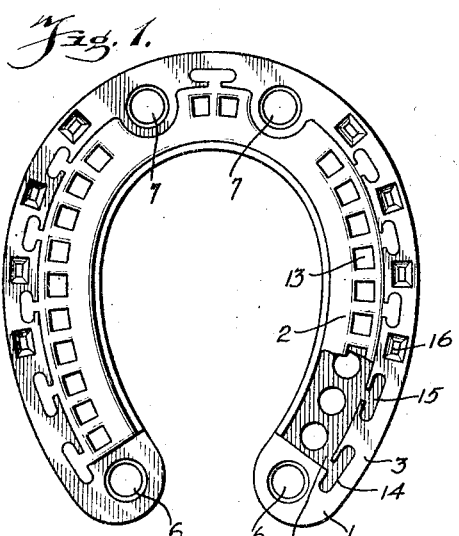
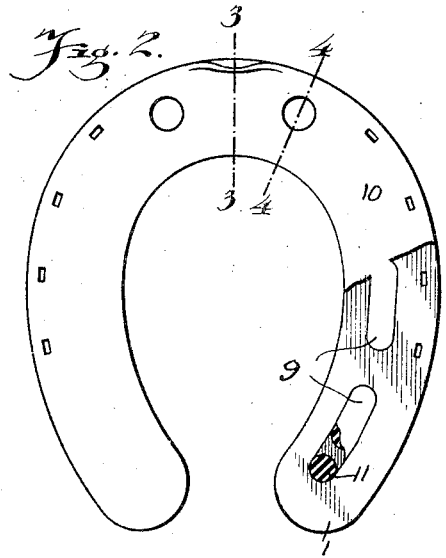
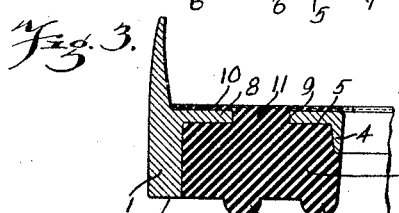
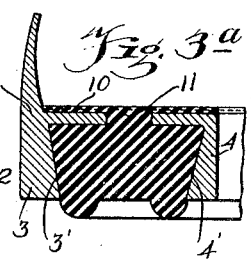
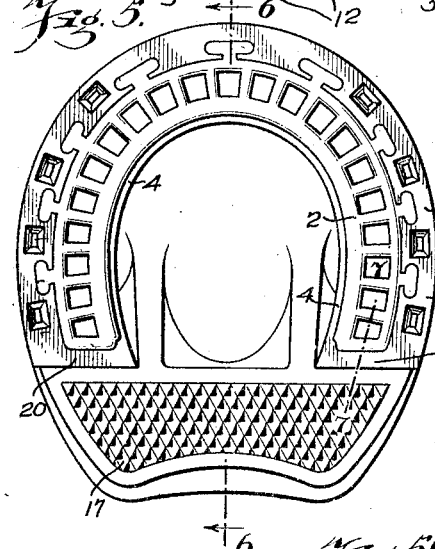
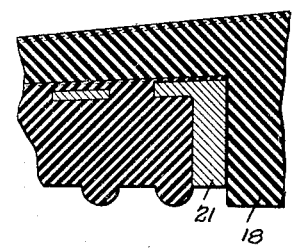
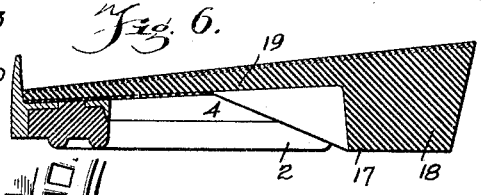
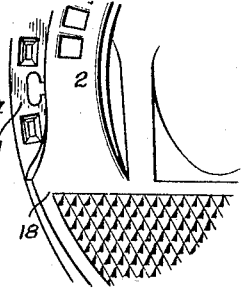
WITNESSES
INVENTORS
FREDERICK C. ROBERTSON
PHILLIP P. ROONEY
BY
ATTORNEYS Dec. 11, 1923.　　　　　F. C. ROBERTSON ET AL　　　1,477,007
HORSESHOE
Filed April 2, 1921　　　2 Sheets-Sheet 2
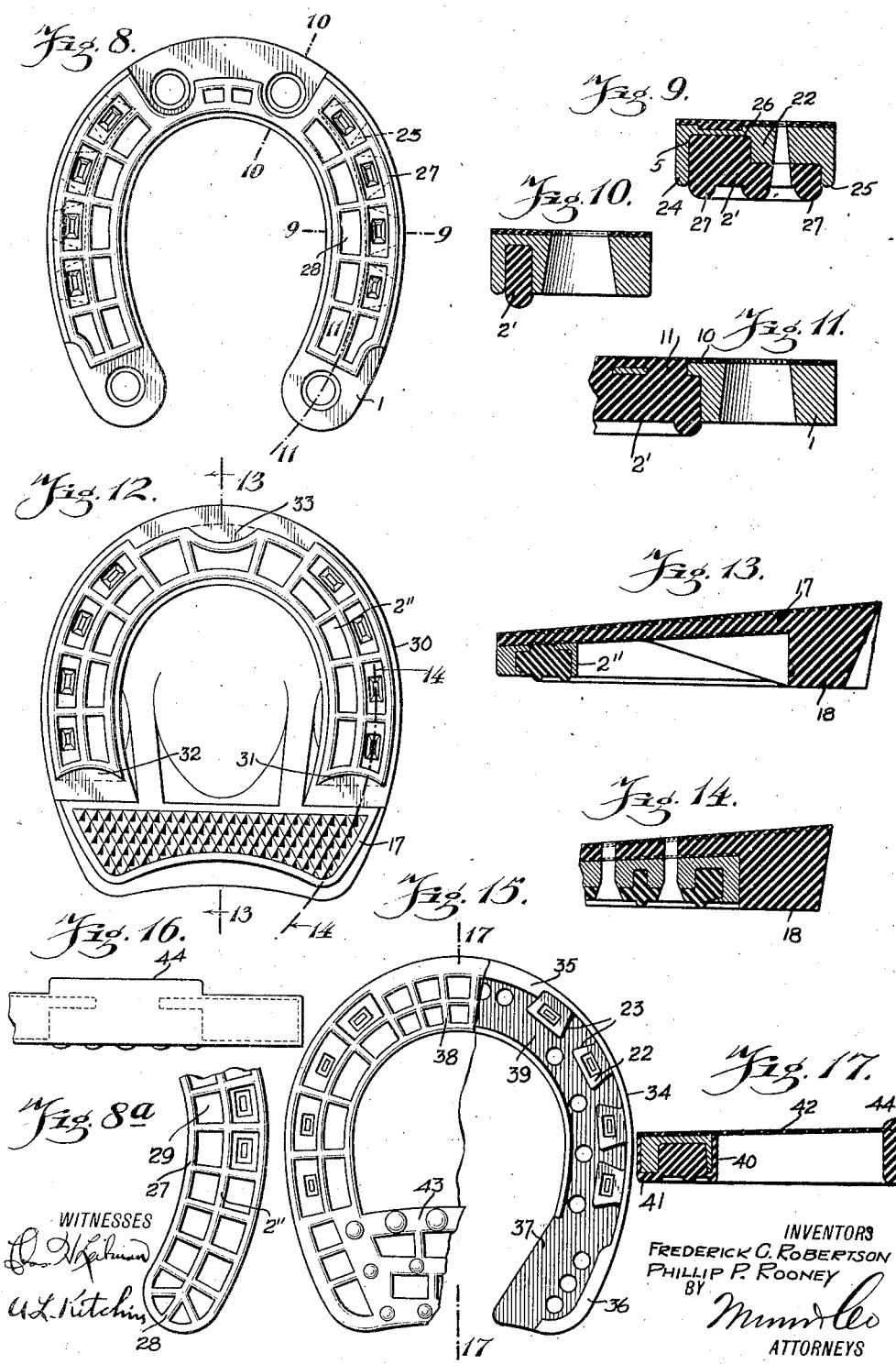
INVENTORS
FREDERICK C. ROBERTSON
PHILLIP P. ROONEY
BY
ATTORNEYS Patented Dec. 11, 1923.

1,477,007

UNITED STATES PATENT OFFICE.

FREDERICK CONRAD ROBERTSON, OF SPOKANE, WASHINGTON, AND PHILLIP PATRICK ROONEY, OF NEW YORK, N. Y., ASSIGNORS, BY MESNE ASSIGNMENTS, TO RUBBER-METAL HORSE FOOTWEAR, INC., OF BUFFALO, NEW YORK, A CORPORATION OF NEW YORK.

HORSESHOE.

Application filed April 2, 1921. Serial No. 457,863.

*To all whom it may concern:*

Be it known that we, FREDERICK C. ROBERTSON and PHILLIP P. ROONEY, both citizens of the United States, and residents, respectively, of Spokane, in the county of Spokane and State of Washington, and the city of New York, borough of Manhattan, in the county and State of New York, have invented a new and Improved Horseshoe, of which the following is a full, clear, and exact description.

This invention relates to a horseshoe and particularly to an improved combined rubber and metal horseshoe, and has for an object to provide an improved construction wherein the usual strength and reinforcing action of metal is retained but the resilient action and the gripping tendency of rubber secured.

Another object in view is to provide a horseshoe which, while embodying the same principles, may be formed in a number of different ways so that it will present the combined rubber and metal feature and at the same time be adaptable for use as a complete shoe or as a tip to be used with a rubber pad.

A further object of the invention is to provide a combined rubber and metal horseshoe wherein the rubber is anchored by integral rubber key members.

A still further object of the invention is to provide a horseshoe which retains the rubber and metal characteristics, and in addition presents a key structure for holding the rubber in place while affording a thickened or raised seat for receiving the retaining nails.

In the accompanying drawings—

Figure 1 is a bottom plan view of a horseshoe disclosing one embodiment of the invention.

Fig. 2 is a top plan view of the horseshoe shown in Fig. 1, certain parts being broken away for illustrating a certain interlocking action of the rubber.

Fig. 3 is a sectional view through Fig. 2 on line 3—3.

Fig. 3ª is a sectional view similar to Fig. 3 but showing a different-shaped cushion-receiving cavity.

Fig. 4 is a sectional view through Fig. 2, on line 4—4.

Fig. 5 is a bottom plan view of a tip constructed similar to the shoe illustrated in Fig. 1 together with a pad used in connection therewith.

Fig. 5ª is a fragmentary bottom plan view showing the same construction as illustrated in Fig. 5 except the rubber of the tip is cast integral with the rubber of the pad.

Fig. 6 is a sectional view through Fig. 5 on line 6—6.

Fig. 7 is a fragmentary sectional view through Fig. 5 on line 7—7, the same being on an enlarged scale.

Fig. 8 is a bottom plan view of another form of the invention.

Fig. 8ª is a fragmentary bottom plan view showing part of a horseshoe similar to Fig. 8 but with the rubber extending over the entire shoe.

Fig. 9 is a sectional view through Fig. 8 on line 9—9.

Fig. 10 is a sectional view through Fig. 8 on line 10—10.

Fig. 11 is a fragmentary sectional view through Fig. 8 on line 11—11.

Fig. 12 is a bottom plan view of a tip similar to the horseshoe illustrated in Fig. 8, the same being used in connection with a pad.

Fig. 13 is a sectional view through Fig. 12 on line 13—13.

Fig. 14 is a fragmentary sectional view through Fig. 12 on line 14—14.

Fig. 15 is a bottom plan view with certain parts broken away illustrating a further modified form of shoe to that shown in Fig. 8.

Fig. 16 is a rear view of the shoe shown in Fig. 15, one side being broken away.

Fig. 17 is a sectional view through Fig. 15 on line 17—17.

In the construction of ordinary metallic horseshoes a stiff metallic structure is presented which acts in a very efficient manner to hold the hoof of the horse in proper shape and also provides a good surface to come in contact with the ground. Where the shoe is smooth or comparatively smooth and made of all metal, it causes the horse to slip to a greater or less extent when going up a hill or pulling heavy loads and this is particularly true where the streets are wet. To obviate this, various devices have been gotten up including the commonly used calk. A good set of calks will prevent slipping even on wet streets, but in most cities laws have been passed preventing the use of efficient calks because the calks dig up the streets to an undesirable extent. Various efforts have been made to secure the desirable results of an ordinary metallic shoe and calks, as for instance, the use of all-rubber shoes or a rubber pad in connection with an ordinary shoe. These various efforts have produced certain desirable results but do not answer all of the requirements including long wear and an efficient action on all kinds of pavements or roadways.

In the present invention, the inventive idea has been disclosed in a number of different forms showing means which will secure the combined advantage of the rubber horseshoe and metallic horseshoe while at the same time obviate the disadvantage of both of these shoes.

Referring to the accompanying drawings by numerals, 1 indicates the body of a shoe which is metallic and adapted to carry or co-act with a filler 2 of rubber. The shoe 1 is made in the usual shape of horseshoes as far as the general outline is concerned and is provided with a comparatively thick outer wall 3 and a comparatively thin inner wall 4 which extends about half as far down as the outer wall. This forms an opening or cavity 5 which extends from near one end around to near the opposite end with enough space left at the two ends for calk-receiving apertures 6 and suitable interruptions for calk-receiving apertures 7 near the toe. The covering or body plate 8 connecting the walls 3 and 4 is provided with a number of apertures 9 through which the rubber 2 extends so that the rubber may overflow and form keys or locking lugs. This forms as many keys or locking lugs 11 as there are openings 9. The section of the rubber filler 2 which lies on the inside of the body plate 8 is designated at 10.

As shown in Fig. 2, the openings 9 are preferably elongated, though other forms can be provided without departing from the spirit of the invention. In forming the rubber filling 2 the cavity 5 is filled until it is level with the bottom edge of the wall 3 and in addition is provided with a number of raised portions or beads 12 which may take different forms as desired but preferably arranged so that one of the beads 12 will form a raised portion substantially parallel with the wall 3 and also will produce different suction cups or cavities 13. In the drawing, these cavities have been shown square but it will be evident that they may be round, oval or any other shape without departing from the spirit of the invention. It will be noted that by this construction and arrangement, a large bearing section is provided at the lower edge of wall 3 so that a metal support is presented while an ample body of rubber 2 is always present to give the desired cushion and the desired gripping action so as to prevent slipping. In order to positively lock the rubber filling 2, a number of horizontally disposed dovetail-shaped sockets or openings 14 are provided into which the rubber extends and thereby forms keys 15. It will thus be seen that the rubber filling 2 is locked by the key members 15 and by the key lugs 11. It will be understood also that the filling rubber 2 is vulcanized directly in place so that it will adhere to the body 1 by its natural tendency to stick to other articles in addition to being held in place by the key members 11 and 15. A suitable number of nail apertures 16 are provided in the wall 3 whereby a shoe may be secured to the horse's hoof in the usual manner.

In Figs. 5, 6 and 7 a modified construction is shown, said modification consisting principally in providing a horseshoe tip which is the same as the horseshoe shown in Fig. 1 except for the fact that the heels have been cut off to shorten up the shoe in order that it may fit into a pad 17 which is now in use on the market. The pad 17 is provided with a large transversely positioned piece of rubber 18 designed to be arranged under the heel, said rubber merging into a body 19 adapted to extend under the entire hoof to the toe. Heretofore, pads of this kind have been used but only in connection with ordinary metallic horseshoes having sufficient thereof removed to produce the desired fit. Applicant's tip is made especially to fit these pads so that the ends 20 thereof are formed with upstanding metal walls 21 which merge into the walls 3 and 4. Preferably, the walls 3 and 4 as well as the rubber filling 2 taper upwardly from the toe of the shoe to the rubber member 18 whereby there will be a continuous inclined surface extending from the rear of the rubber 18 to the front or toe of the shoe (Figs. 6 and 7.)

In Fig. 5ª will be seen a slightly modified form of shoe to that illustrated in Fig. 5 wherein the rubber filling 2 merges into the rubber block 18 and forms an integral structure as far as the rubber is concerned while the metal body 1 is positioned and constructed as illustrated in Fig. 5.

Figs. 8 to 11 inclusive, another form of the invention is disclosed in which the body 1 of the shoe is provided with a number of raised portions or nail seats 22. These nail seats have diverging walls 23 as shown in Fig. 15 so that a dovetail or clinching key is provided for the rubber filling 2'. In this form of the invention both of the walls 24 and 25 are of the same size and are comparatively thin, said walls merging into a top plate 26 which is preferably of the same thickness as the side walls. In forming the filling of rubber 2' a number of raised portions 27 are provided arranged as beads with depressions 28 therebetween forming vacuum or suction cups. The inner and outer beads 27 are set back from the walls 24 and 25 so that there will be no pinching or grinding action between these beads and the walls when in use. Also, this arrangement causes the beads to have the advantage of a resilient action of a comparatively deep layer of rubber and, consequently, present a proper wearing and gripping surface but also a structure which will give under great pressure. Aside from these features, the construction is the same as shown in Fig. 1 and, therefore, will need no additional description.

In Fig. 8ᵃ a slightly modified structure is shown to that illustrated in Fig. 8. The modification consists in moving the beads 27 so that they will be directly over the walls 24 and 25 and to extend these beads and the remaining part of the filling 2' so as to cover the end 28. From this it will be seen that the rubber is arranged to fill the depression 5 and to overlap the entire shoe so that a complete rubber facing will be presented having raised portions or beads and suction or vacuum cups 29 provided by reason of the raised portions.

In Figs. 12, 13, and 14 a modified structure is shown which is identical to Fig. 8 except that the pad 17 is provided and the shoe is cut off at the heel end and formed with overlapping projections 31 and 32 which co-act with the projection 33 for clamping the rubber filling 2'' in place. Preferably, both the metal part of the body 30 and the filling of rubber 2' are inclined or beveled as indicated in Figs. 12, 13, and 14 so that the heels of the shoe will be sufficiently flush with the rubber block 18.

Figs. 15, 16 and 17 disclose an additional modified form of the invention wherein body 34 is provided with parallel inner and outer walls, the outer wall merging into a thickened section 35 at the toe and 36 at the heel while the inner wall is cut away at 37. In this form of the invention, thickened or raised lugs 22 are provided for the reception of the horseshoe nails, said lugs having beveled walls 23 so as to lock the filling of rubber 38 firmly in place. It will be noted that the filling of rubber fills the cavity 39 and extends entirely across the horseshoe and is provided with covering webs 40 and 41 as well as a top covering 42 which may have canvas imbedded therein. The filling 40 extends across the heel of the shoe and forms a heel pad 43 which is preferably provided with a raised section 44 while extending entirely across the heel of the shoe. It will be noted from Fig. 17 that the entire body 34 is covered with a layer of rubber and by reason of the cavity 39 the rubber filling is of such depth as to give the desired resiliency and gripping action necessary to produce a successful shoe.

In Fig. 3ᵃ a modified construction of cavity is shown which presents an extraordinary strong anchoring action in connection with the rubber, whereby the rubber cushion or other cushioning material is firmly interlocked or anchored in the metal body of the horseshoe. It will be noted that in this figure the side walls 3' and 4' are inclined for producing a dovetail cavity in cross-section. This modified form of cavity is shown in a construction similar to that illustrated in Figs. 1, 2, and 3; but it will be evident that this same arrangement of walls 3' and 4' may be provided in the other forms of shoe illustrated, and in fact in any form of shoe coming within the spirit of the invention.

What we claim is:—

1. A composite horseshoe comprising a metallic body having a substantially solid and relatively wide rim portion, the upper edge of which defines the outer peripheral edge of the horseshoe, said metallic body being provided with a cavity contiguous with said rim portion though spaced a substantial distance from the periphery or outer edge of the body and extending around the entire length of the body, the cavity being located between the inner and outer peripheral edges of the metallic body, and a filling of rubber arranged in said cavity, said rubber projecting beyond the face of the metallic body, the metallic body being provided with a plurality of horizontally disposed dovetail-shaped recesses arranged around the rim and opening into the cavity, the rubber filling being provided with projections fitting into said dovetail recesses to interlock the metallic body and rubber filling.

2. A composite horseshoe of the character described comprising a metallic element having a portion constituting the outer marginal portion of the tread of the shoe, said outer marginal portion being comparatively wide in respect to the width of the shoe, and a pad or filling member of cushioning material imbedded in said metallic element and projecting therefrom so as to present a wearing and gripping surface of cushioning material, together with interlocking extensions projecting from said cushioning material into said metallic element.

3. A horseshoe of the character described comprising a metal body formed with a cavity arranged parallel with the sides, a pair of calk-receiving openings at the heel of the body and a pair of calk-receiving openings at the toe of the body, and a rubber filling arranged in said cavity formed with extensions acting as anchoring means arranged so that the outer peripheral edge of the filling will be spaced from the outer peripheral edge of the metal body.

4. In a horseshoe of the character described, the combination with a pad having an enlargement at one end, of a tip therefor formed with a rubber section which projects above the body of the tip sufficiently to coact with said projection for forming a substantially even contact surface.

5. In a horseshoe of the character described, the combination with a pad provided with an enlargement, of a tip for said body arranged so that the heels will rest against the enlargement, said tip being formed with a metallic body having a cavity extending from near one heel to the other, and a filling of rubber arranged in said cavity and projecting therefrom, said filling of rubber being provided with projections interlocking with certain parts of the metallic body.

6. A combined horseshoe and pad comprising a horeshoe tip formed of metal and provided with a cavity, and a rubber filling arranged in said cavity and merging into a pad with a body resting against the top of the metallic tip and a projection extending across the end of the metallic tip and merging into the rubber in the cavity beneath the ends of said metallic body.

7. A horseshoe comprising a body of metal formed with a cavity and a plurality of bosses positioned in said cavity having apertures therethrough for receiving nails, and a rubber filling for said cavity, said filling extending over said bosses and beyond the lower surface of said metal body.

8. A horseshoe comprising a metal body having a cavity therein, said body being provided with a plurality of bosses in said cavity arranged with their walls radiating from a substantially central point, and a filling of rubber for said cavity, said filling of rubber extending between said bosses and underlying said bosses whereby a dovetail lock structure will be produced, said rubber projecting beyond the lower surface of said metal body.

9. A horseshoe comprising a metallic body having a cavity therein extending from near one heel around to near the opposite heel, said body being formed with a plurality of nail-receiving bosses, said bosses being arranged in said cavity and extending an appreciable distance downwardly from the bottom thereof, and a rubber filling arranged in said cavity, said filling projecting beyond the lower face of said metallic body but arranged so that the inner and outer edges of the filling will be spaced from the inner and outer edges of the metallic body a distance of the thickness of the inner and outer walls arranged on opposite sides of the cavity.

10. In a horseshoe of the character described, the combination with a pad having a body and a projection, of a tip fitting on said body with the heels resting against said projection, said tip comprising a metal element having a depression or cavity extending from near one heel to near the opposite heel and a plurality of nail-receiving bosses positioned in said cavity, and a filling of rubber arranged in said cavity and overlying said bosses, said rubber projecting beyond the lower face of said metallic element.

11. A combined pad and tip comprising a pad member and a tip member formed with a metallic body having a cavity or depression therein arranged with a plurality of overhanging projections overhanging said cavity, and a filling of rubber arranged in said cavity and extending beneath said projections whereby the filling is locked in place.

12. In a horseshoe of the character described, a metallic body having a cavity therein extending entirely around the body, and a filling of rubber arranged in said cavity formed with a projection interlocking with certain parts of the body and with the heel pad extending across from one heel of the body to the other, the lower surface of said pad and the lower surface of the filling presenting a substantially even contact surface.

FREDERICK CONRAD ROBERTSON.
PHILLIP PATRICK ROONEY.